(12) United States Patent
Katz

(10) Patent No.: US 6,942,886 B2
(45) Date of Patent: Sep. 13, 2005

(54) SOFT CANDIES FOR ICE CREAM AND METHOD OF MAKING

(76) Inventor: Emmanuel E. Katz, 3019 Monterey Dr., Flossmoor, IL (US) 60422

( * ) Notice: Subject to any disclaimer, the term of this patent is extended or adjusted under 35 U.S.C. 154(b) by 743 days.

(21) Appl. No.: 09/876,881

(22) Filed: Jun. 7, 2001

(65) Prior Publication Data
US 2002/0197356 A1 Dec. 26, 2002

(51) Int. Cl.⁷ ................................................ A23G 9/00
(52) U.S. Cl. .................... 426/101; 426/103; 426/565; 426/576; 426/577; 426/660
(58) Field of Search ................. 426/101, 576, 426/577, 660, 565

(56) References Cited

U.S. PATENT DOCUMENTS

| | | | | |
|---|---|---|---|---|
| 3,097,951 A | * | 7/1963 | Greninger et al. | 426/578 |
| 4,397,880 A | * | 8/1983 | Crothers | 426/565 |
| 4,500,553 A | * | 2/1985 | Liggett et al. | 261/1 |
| 5,147,669 A | * | 9/1992 | Crothers | 426/94 |
| 5,554,406 A | * | 9/1996 | Muenz et al. | 426/573 |
| 5,626,896 A | * | 5/1997 | Moore et al. | 426/103 |
| 6,365,209 B2 | * | 4/2002 | Cherukuri | 426/72 |
| 6,514,555 B1 | * | 2/2003 | Fayard et al. | 426/565 |
| 6,528,102 B1 | * | 3/2003 | Coyle et al. | 426/103 |
| 6,531,169 B2 | * | 3/2003 | Best et al. | 426/91 |
| 2002/0076478 A1 | * | 6/2002 | Grazela et al. | 426/660 |
| 2002/0197358 A1 | * | 12/2002 | Tachikawa et al. | 426/103 |
| 2003/0035877 A1 | * | 2/2003 | Best et al. | 426/565 |

* cited by examiner

Primary Examiner—N. Bhat
(74) Attorney, Agent, or Firm—Thomas A. Marcoux; Thaddius J. Carvis

(57) ABSTRACT

A process is provided for preparing soft, gummy candies that retain their physical shapes well and have a pleasant bite and chew when employed in ice cream. The process entails preparing a first premix of sucrose, glycerin, corn syrup and water and blending it with a hydrated gelatin/pectin solution. The resulting combined solution is then cooked at elevated temperature and pressure to form a candy melt. The resulting candy melt is reduced in moisture content and mixed with color, flavor and acid prior to forming the candy melt into discrete, soft candy pieces, e.g., by depositing in starch moulds. The candies are mixed with ice cream to form a soft candy and ice cream confection.

10 Claims, 1 Drawing Sheet

SOFT CANDIES FOR ICE CREAM AND METHOD OF MAKING

BACKGROUND OF THE INVENTION

The invention relates to soft candies useful in ice cream products, to ice cream containing them and to a process for preparing them.

Gum and jelly candies constitute a large class of confectionery products and are manufactured in a variety of shapes and textures. They can be classified also as low-boiled candies because they contain about 20% moisture. The texture can vary from soft to firm, depending on the moisture and the type of water binding and gelling agents employed. Notable products of this type are jelly drops, fruit slices and various soft animal, creature and shapes sold under various trademarks such as GUMMI SAVERS, GUMMY BEARS, and BABY GUMMY WORMS.

A number of gelling agents are utilized, among which are starch, gelatin, pectin gum arabic and agar. Processing typically starts with the preparation of a boiled mixture of mixed sugars which is then blended with the gelling agent and processed into any of a wide range of shapes by depositing into starch moulds. It can also be simply cast onto a slab or cast into rubber moulds. The pieces are then held to set and dry. For a general description of this type of process, see Lees and Jackson; *Sugar Confectionery and Chocolate Manufacture*; 1973 (ISBN 0249 44120 9); pages 226–268. This reference is incorporated by reference herein in its entirety.

It would be desirable to use gummy candies of this type in ice cream, but a suitable gummy candy formulation or process for this use is not available. Candies made with either starch tend to dissolve into the ice cream, losing some of their structural integrity, while gelatin-based candies are difficult to bite and chew. The candies made from starch can be tender and have a short texture. Starch and gelatin candies can have a good degree of resilience at room temperature, but tend to become too hard at freezer temperatures. Pectin candies can also have a short, soft texture at room temperature, but have not been found acceptable in terms of texture at freezer temperatures.

There is a need for a process for soft candies that retain their integrity in ice cream while being pleasantly chewable.

DISCLOSURE OF INVENTION

Accordingly, it is an object of the invention to provide gummy candies that retain their physical shapes well and have a pleasant bite and chew when employed in ice cream.

It is an object of the invention to provide an ice cream product having dispersed therein gummy candies that retain their physical shapes well and have a pleasant bite and chew.

It is a more specific object of the invention to provide a method for preparing gummy candies that retain their physical shapes well and have a pleasant bite and chew when employed in ice cream.

These and other objects are realized by the present invention, which provides a process for soft candies suitable for use in ice cream, ice cream containing these candies and a process for preparing them.

In one aspect of the invention, a process is provided for preparing gummy candies that retain their physical shapes well and have a pleasant bite and chew when employed in ice cream.

In another aspect, the invention provides gummy candies that retain their physical shapes well and have a pleasant bite and chew when employed in ice cream. They are prepared by a process comprising: preparing a first premix by heating a mixture ingredients comprising sucrose, glycerin and corn syrup and water sufficiently to dissolve the ingredients in the water; preparing a hydrated gelatin/pectin solution by heating a blend of gelatin and pectin in water sufficiently to dissolve the pectin and gelatin in the water; blending the first premix and the hydrated gelatin/pectin solution to form a combined mixture; cooking the combined mixture at elevated temperature and pressure to form a candy melt; feeding the candy melt to a vacuum chamber resulting in water vapor being flashed off; feeding the resulting candy melt of reduced moisture content to a mix tank and adding color, flavor and acid; and forming the candy melt into discrete, soft candy pieces, e.g., by depositing in starch moulds.

In another aspect, the invention provides a new ice cream product having dispersed therein gummy candies that retain their physical shapes well and have a pleasant bite and chew.

Other preferred aspects of the invention will be detailed below.

BRIEF DESCRIPTION OF THE DRAWINGS

The invention will be better understood and its advantages will become more apparent from the following detailed description, especially when read in light of the accompanying drawings, wherein.

DETAILED DESCRIPTION OF THE INVENTION

Figure 1:
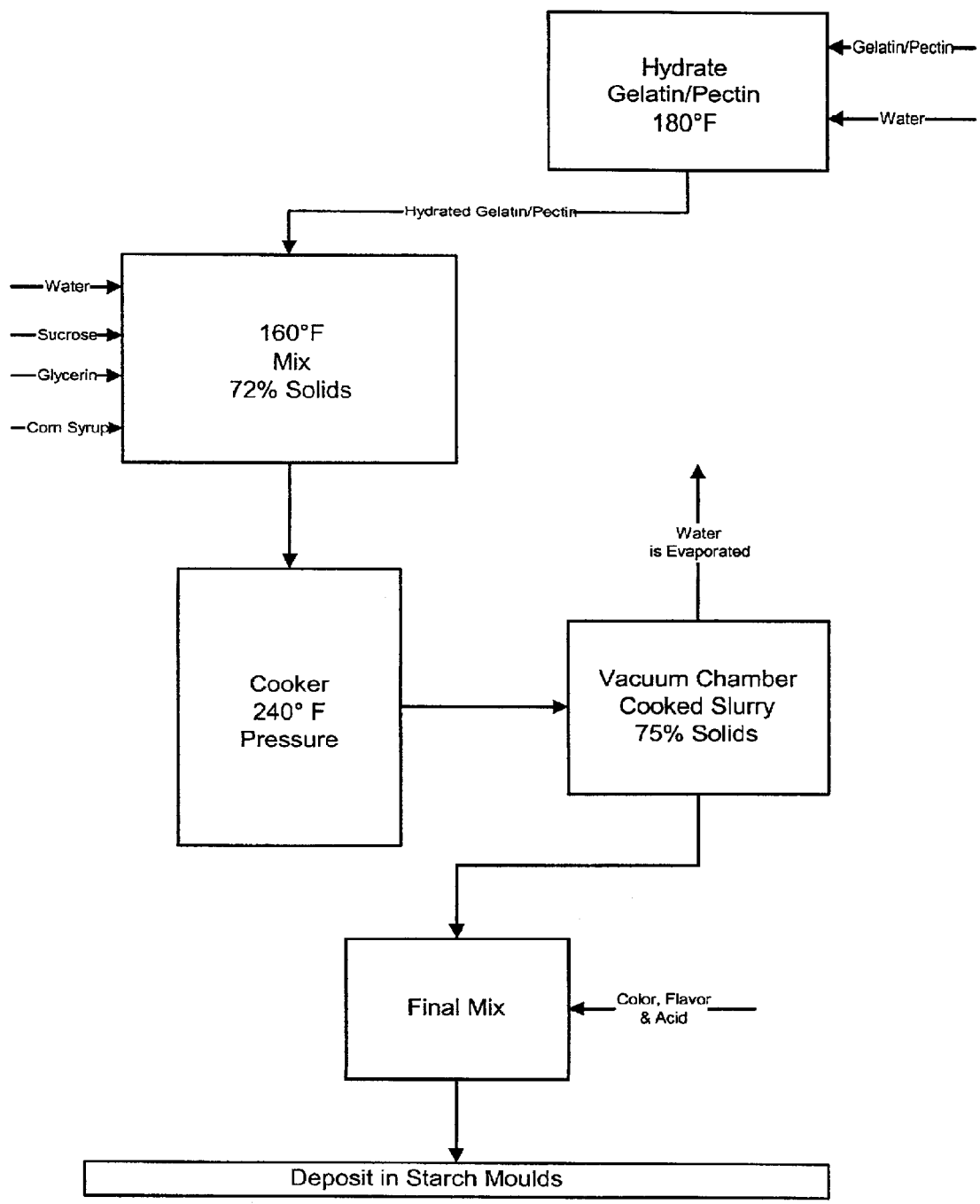
FIG. 1 is a flow diagram of a typical process for gummy candy preparation.

The invention will be described below with specific reference to preferred candy formulation and ice cream product containing it. The candy formulation will contain sucrose, corn syrup, glycerin, gelatin, pectin, food acid to set the pectin and color and flavor as desired. It has been found that the formulation provides superior results in the context of ice cream additions than similar candies employing other gelling agents, such as pectin alone, gelatin alone or starch alone.

The invention will contain enough sugars in the form of sucrose and corn syrup to achieve a total sugar concentration of from about 73 to about 80% in the final product. In general, the sugar solids concentration will be from about 1 to 5% lower than a candy formulation made for room-temperature consumption. A preferred weight ratio of sucrose to corn syrup solids will be within the range of from about 1:2 to about 2:1, preferably from about 2:3 to 3:2. The sucrose can be employed in any suitable physical form to achieve the batching requirements. Typically, the sucrose will be granular and the corn syrup will preferably be added as a liquid having a DE of greater than 42, e.g., 63 DE. The higher DE values will decrease the tendency for granulation and aid in maintaining softness.

The glycerin is a humectant and freezing point depressant. It also helps decrease the tendency for granulation and aid in maintaining softness. Typically, the glycerin or equivalent material will be employed at a level of from about 1 to about 5% by weight of the final product, e.g., 2 to 3%.

The invention employs a combination of gelatin and pectin, with improved results over the use of either one alone or starch. The gelatin and pectin will preferably be employed at a weight ratio supplying at least 50% gelatin and at least 10% pectin, e.g., from about 70 to 85% gelatin and the remainder pectin. The pectin of preference is a high methoxy pectin obtained from apples and the gelatin of preference is a type A gelatin from porcine sources. Typical bloom values for the gelatin will be in the range of from 100 to 280, e.g., about 250. A combination meeting the criteria of the invention is available commercially from SKW Biosystems, Waukesha, Wis., as Geline 10 a product also containing sodium/potassium tartrate as a buffer. The combination of gelatin and pectin will preferably be employed at a level of from about 4.5 to about 6% by weight of the final product, e.g., about 5.5% on that basis.

The pectin will require the addition of sufficient food acid to set the pectin. The food acid can be any of those commonly employed in candies and soft drinks. The dry food acid preferably comprises a member selected from the group consisting of adipic, citric, fumaric, malic, and mixtures of at least two of these. Of these, citric acid is preferred. The amount of acid will be in the typical range of from about 0.5 to about 2% by weight, e.g., about 1.25%.
Also Preferred in Candies are Color and Flavor, as Desired FIG. 1 is a flow diagram of a typical process for gummy candy preparation as is suitable for the practice of the invention. In carrying out the process of the invention, a first premix is prepared containing the sucrose, corn syrup, glycerin and a portion of the water. The water is blended with these ingredients with sufficient heating to fully dissolve all solids, e.g., at 160° F. for at least about 10 minutes or until a solution is formed.

In a separate tank, the gelatin and pectin are hydrated with the remaining water and heated, e.g., at 180° F. Of course, if desired, the exact premix ingredients can be adjusted to meet the needs of production or floor space. The hydrated solution of gelatin and pectin is then blended with the first premix and the combined mixture is fed to a cooker wherein it is cooked, e.g., at 260° F., under sufficient pressure to achieve this temperature for from about 1 to about 10 minutes, as needed without overcooking. Batch or continuous processing can be employed. Following cooking, the mixture is passed to a vacuum chamber and water vapor is flashed off due to the release of pressure.

The remaining liquid is then fed to a final mix tank where the color, flavor and acid are added prior to depositing in starch moulds or otherwise forming into discrete pieces as is known to the art. The moulds holding the candy are then stored overnight at least ambient to about 90° F. to fully set and reach a final moisture of about 25%.

If desired, following demoulding, the candy can be coated with sugar or vegetable oil as is known to prevent sticking of the pieces.

The candy is blended as convenient with ice cream prior to freezing or after freezing but prior to hardening. The candy and ice cream components being present at a weight ratio of about 1–20 parts candy to 100 parts ice cream by weight.

The following examples are provided to further illustrate and explain a preferred form of the invention and are not to be taken as limiting in any regard. Unless otherwise indicated, all parts and percentages are by weight. The compositions below illustrate exemplary ranges of ingredients.

EXAMPLE 1

| Ingredient | Parts by Weight, Wet | Parts by Weight, Dry |
| --- | --- | --- |
| Water | 245 | |
| Sucrose | 375 | 373 |
| Corn Syrup, 63 DE | 600 | 485 |
| Glycerin | 34 | 33 |
| Gelatin/Pectin | 75 | 68 |
| Acid | | |
| Color and Flavor | | |

A first premix of the sucrose, corn syrup, glycerin and 50 parts of the water was prepared by blending and heating these ingredients in a tank at 160° F. until a solution is formed. In a separate tank, the gelatin and pectin are hydrated with the remaining water at 180° F. The hydrated solution of gelatin and pectin is then blended with the first premix and the combined mixture is fed to a cooker wherein it is cooked at about 240° F. under pressure for about 1 minute in a continuous cooker. Following cooking, the mixture is passed to a vacuum chamber and water vapor is flashed off. The remaining liquid is then fed to a final mix tank where the color, flavor and acid are added prior to depositing in starch moulds. The moulds holding the candy are then stored overnight at about 90° F. to fully set and reach a final solids of about 75%.

EXAMPLE 2

An ice cream and candy combination was prepared by softening a commercial hard freeze ice cream, mixing in the candies prepared in Example 1 at a weight ratio of about 10 parts candy to 100 parts ice cream, by weight. The resulting mixture was then refrozen at about 0° F. for about 48 hours. The product was then evaluated for the character and quality of the candies.

The above description is intended to enable the person skilled in the art to practice the invention. It is not intended to detail all of the possible modifications and variations, which will become apparent to the skilled worker upon reading the description. It is intended, however, that all such modifications and variations be included within the scope of the invention which is defined by the following claims. The claims are meant to cover the indicated elements and steps in any arrangement or sequence which is effective to meet the objectives intended for the invention, unless the context specifically indicates the contrary.

What is claimed is:

1. A process for preparing gummy candies that retain their physical shapes well and have a pleasant bite and chew when employed in ice cream, comprising:

preparing a first premix by heating a mixture ingredients comprising sucrose, glycerin and corn syrup and water sufficiently to dissolve the ingredients in the water;

preparing a hydrated gelatin/pectin solution by heating a blend of gelatin and pectin in water sufficiently to dissolve the pectin and gelatin in the water;

blending the first premix and the hydrated gelatin/pectin solution to form a combined mixture;

cooking the combined mixture at elevated temperature and pressure to form a candy melt;

feeding the candy melt to a hold tank resulting in water vapor being flashed off;

feeding the resulting candy melt of reduced moisture content to a mix tank and adding color, flavor and acid; and forming the candy melt into discrete, soft candy pieces.

2. A process according to claim 1 wherein the candy melt is formed by depositing into starch moulds.

3. A process according to claim 1 wherein the final candy solids is about 75%.

4. A process according to claim 1 wherein the combination of gelatin and pectin are employed at a level of from about 4.5 to about 6% by weight of the final product and the gelatin and pectin are present at a weight ratio supplying at least 50% gelatin and at least 10% pectin of the combination.

5. A process according to claim 1 wherein the glycerin is employed at a level of from about 1 to about 5% by weight of the final product.

6. A process according to claim 1 wherein the weight ratio of sucrose to corn syrup solids is within the range of from about 1:2 to about 2:1 of the final product.

7. A process according to claim 1 wherein the sugars in the form of sucrose and corn syrup are present in amounts effective to achieve a total sugar concentration of from about 73 to about 80% in the final product.

8. A process for preparing gummy candies that retain their physical shapes well and have a pleasant bite and chew when employed in ice cream, comprising:

preparing a first premix by heating a mixture ingredients comprising sucrose, glycerin and corn syrup and water sufficiently to dissolve the ingredients in the water;

preparing a hydrated gelatin/pectin solution by heating a blend of gelatin and pectin in water sufficiently to dissolve the pectin and gelatin in the water, the combination of gelatin and pectin being employed at a level of from about 4.5 to about 6% by weight of the final product and the gelatin and pectin are present at a weight ratio supplying at least 50% gelatin and at least 10% pectin of the combination;

blending the first premix and the hydrated gelatin/pectin solution to form a combined mixture;

cooking the combined mixture at elevated temperature and pressure to form a candy melt;

feeding the candy melt to a hold tank resulting in water vapor being flashed off;

feeding the resulting candy melt of reduced moisture content to a mix tank and adding color, flavor and acid; and forming the candy melt into discrete, soft candy pieces by depositing into starch moulds and holding to achieve a final moisture of about 25% by weight.

9. A process according to claim 8 wherein the sugars in the form of sucrose and corn syrup are present in amounts effective to achieve a total sugar concentration of from about 73 to about 80% in the final product and the weight ratio of sucrose to corn syrup is within the range of from about 2:3 to about 3:2 of the final product.

10. An ice cream and gummy candy confection comprising a candy prepared according to the process of claim 1, these components being present at a weight ratio of about 1–20 parts candy to 100 parts ice cream.

* * * * *